(12) United States Patent
Takatsuto et al.

(10) Patent No.: US 7,513,104 B2
(45) Date of Patent: Apr. 7, 2009

(54) DIAGNOSTIC APPARATUS FOR INTERNAL COMBUSTION ENGINE

(75) Inventors: Rie Takatsuto, Yokohama (JP); Hiroshi Katoh, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 443 days.

(21) Appl. No.: 11/231,936

(22) Filed: Sep. 22, 2005

(65) Prior Publication Data

US 2006/0064965 A1    Mar. 30, 2006

(30) Foreign Application Priority Data

Sep. 24, 2004    (JP)    ............... 2004-276634

(51) Int. Cl.
*F01N 3/00*    (2006.01)
(52) U.S. Cl. .................... 60/277; 60/274; 60/284
(58) Field of Classification Search .................. 60/277, 60/274, 284, 285, 299
See application file for complete search history.

(56) References Cited

U.S. PATENT DOCUMENTS

| | | | |
|---|---|---|---|
| 5,591,905 A * | 1/1997 | Fujimoto et al. | ........... 73/118.1 |
| 5,636,514 A * | 6/1997 | Seki | ............... 60/277 |
| 5,987,977 A * | 11/1999 | Hanafusa et al. | ........... 73/118.1 |
| 6,082,101 A * | 7/2000 | Manaka et al. | ................ 60/285 |
| 6,092,368 A * | 7/2000 | Ishii et al. | ...................... 60/277 |
| 6,370,872 B1 * | 4/2002 | Watanabe et al. | ............. 60/288 |
| 6,378,296 B1 * | 4/2002 | Yasui et al. | ................... 60/277 |
| 6,797,517 B1 * | 9/2004 | Hoshi et al. | .................. 436/37 |
| 7,024,850 B2 * | 4/2006 | Nishizawa et al. | ............ 60/277 |

FOREIGN PATENT DOCUMENTS

| JP | 2001-132526 A | 5/2001 |
|---|---|---|
| JP | 2004-132181 A | 4/2004 |

* cited by examiner

*Primary Examiner*—Thomas E Denion
*Assistant Examiner*—Diem Tran
(74) *Attorney, Agent, or Firm*—Foley & Lardner LLP

(57) ABSTRACT

A diagnostic apparatus for an internal combustion engine. An exhaust purification section includes an exhaust purifier disposed in an exhaust passage of the internal combustion engine, for purifying an exhaust emission, and a purifier activation section configured to control engine operating parameters of the internal combustion engine to promote activation of the exhaust purifier during the internal combustion engine being cold. The diagnostic apparatus is configured to determine a state of the exhaust purifier, to determine a total purifier out emission quantity as a quantity of the exhaust emission exiting the exhaust purifier during the internal combustion engine being cold, in accordance with the state of the exhaust purifier, and to determine normality of the exhaust purification section in accordance with the total purifier out emission quantity.

16 Claims, 5 Drawing Sheets

DIAGNOSTIC APPARATUS FOR INTERNAL COMBUSTION ENGINE

BACKGROUND OF THE INVENTION

The present invention relates generally to diagnosis for an internal combustion engine, and more particularly to a diagnostic apparatus for diagnosing normality of an exhaust purification system of an internal combustion engine.

In recent years, in the field of automotive internal combustion engines, it is desired to improve techniques of exhaust gas purification, especially to improve a technique of exhaust gas purification in cold start. In order to rapidly activate a catalyst, a known device or method is configured to perform a catalyst activation operation of increasing an intake air quantity, and retarding an ignition timing. In addition, it is desired to diagnose the catalyst activation operation. A Published Japanese Patent Application No. 2001-132526 (hereinafter referred to as "JP2001-132526") shows such a diagnostic device. The diagnostic device of JP2001-132526 is configured to perform a catalyst activation operation of increasing an intake air quantity, and retarding an ignition timing, to monitor the engine speed and the ignition timing after a predetermined delay from a time point at which the catalyst activation operation starts, and to determine that there is a malfunction in the catalyst activation operation, if the engine continues over a predetermined period to be in a condition in which the engine speed is lower than or equal to a predetermined value, or the ignition timing is later than or equal to a predetermined timing.

SUMMARY OF THE INVENTION

In the diagnostic device of JP2001-132526, the diagnostic operation is performed only in case a condition that the engine operating condition is held in a steady-state operating mode such as an idle mode and a condition that the predetermined delay has elapsed after the start of the catalyst activation operation are both satisfied. Accordingly, it is possible that the frequency of the diagnostic operation is low. For example, in case the engine is employed in an acceleration mode just after cold start, the diagnostic operation is not performed. In this case, it is possible that even when there is abnormality or malfunction in the catalyst activation operation, the abnormality is not detected.

The activity state of a catalyst mainly depends on its temperature or a quantity of heat supplied to the catalyst via exhaust gas. The quantity of heat varies in accordance with an ignition timing and an engine speed, and additionally in accordance with a mass/volume of the exhaust gas which passes through the catalyst. The mass/volume of the exhaust gas varies in accordance with the engine operating condition. In case the engine operating condition varies from an idle mode to a vehicle driving mode, the mass/volume of the exhaust gas increases. Accordingly it is possible that the diagnostic method of JP2001-132526 does not cover many actual driving patterns.

Accordingly, it is an object of the present invention to provide a diagnostic apparatus for an internal combustion engine which diagnoses normality of an exhaust purification system of the internal combustion engine in a wide variety of situations.

According to one aspect of the present invention, a diagnostic apparatus for an internal combustion engine, comprises: an exhaust purification section comprising: an exhaust purifier disposed in an exhaust passage of the internal combustion engine, for purifying an exhaust emission; and a purifier activation section configured to control engine operating parameters of the internal combustion engine to promote activation of the exhaust purifier during the internal combustion engine being cold; and a control unit configured to perform the following: determining a state of the exhaust purifier; determining a total purifier out emission quantity as a quantity of the exhaust emission exiting the exhaust purifier during the internal combustion engine being cold, in accordance with the state of the exhaust purifier; and determining normality of the exhaust purification section in accordance with the total purifier out emission quantity.

According to another aspect of the invention, a diagnostic apparatus for an internal combustion engine, comprises: an exhaust purification section comprising: an exhaust purifier disposed in an exhaust passage of the internal combustion engine, for purifying an exhaust emission; and means for promoting activation of the exhaust purifier during the internal combustion engine being cold; and means for determining a state of the exhaust purifier; means for determining a total purifier out emission quantity as a quantity of the exhaust emission exiting the exhaust purifier during the internal combustion engine being cold, in accordance with the state of the exhaust purifier; and means for determining normality of the exhaust purification section in accordance with the total purifier out emission quantity.

According to a further aspect of the invention, a method of diagnosing an internal combustion engine including an exhaust purification section, the exhaust purification section including an exhaust purifier disposed in an exhaust passage of the internal combustion engine, for purifying an exhaust emission, and a purifier activation section configured to control engine operating parameters of the internal combustion engine to promote activation of the exhaust purifier during the internal combustion engine being cold, comprises: determining a state of the exhaust purifier; determining a total purifier out emission quantity as a quantity of the exhaust emission exiting the exhaust purifier during the internal combustion engine being cold, in accordance with the state of the exhaust purifier; and determining normality of the exhaust purification section in accordance with the total purifier out emission quantity.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
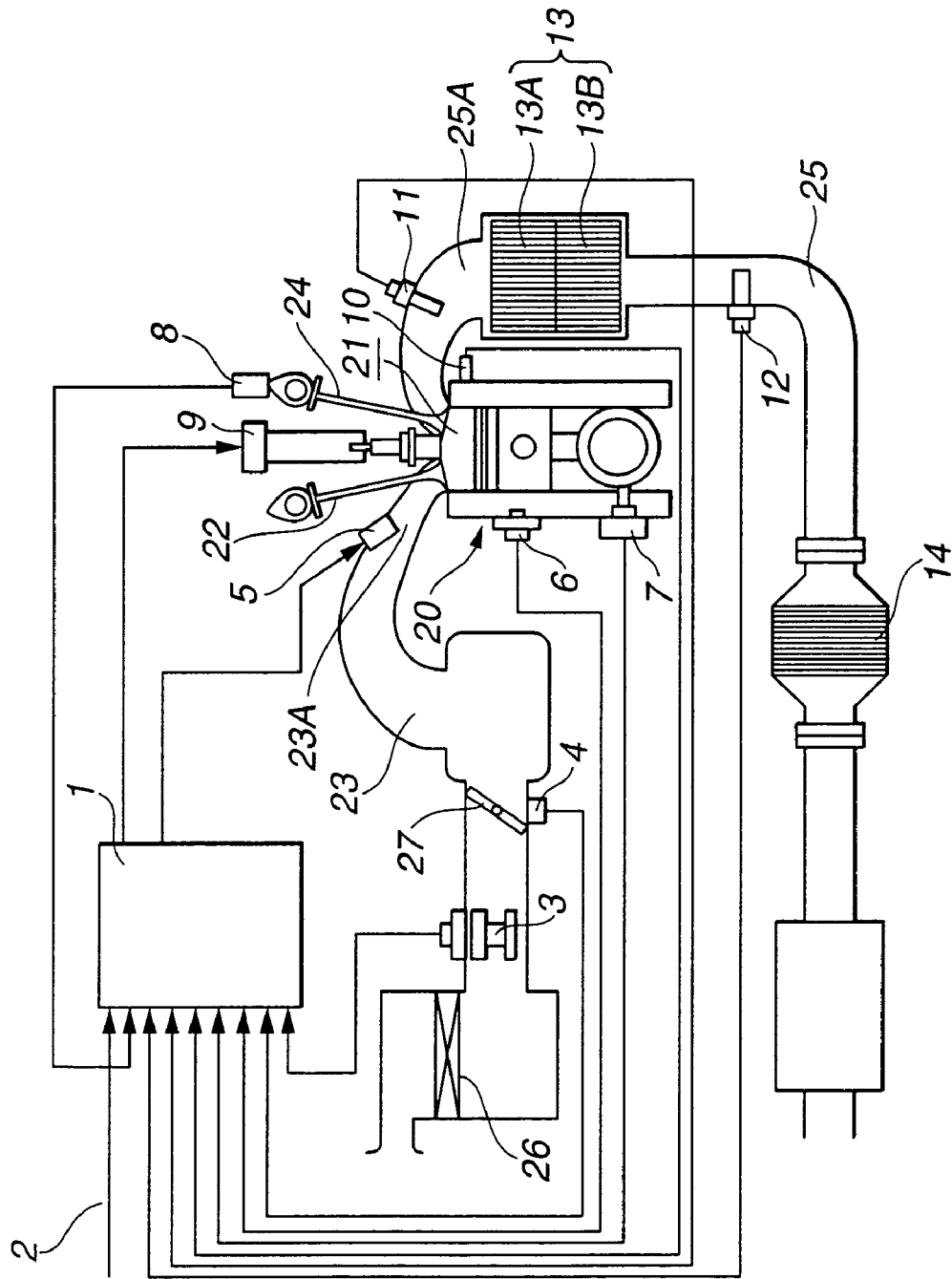
FIG. 1 is a schematic diagram depicting an internal combustion engine with a diagnostic apparatus in accordance with an embodiment of the present invention.

FIG. 1 is a schematic diagram depicting an internal combustion engine with a diagnostic apparatus in accordance with an embodiment of the present invention. As shown in FIG. 1, a combustion chamber 21 of an internal combustion engine 20 is connected to an intake passage 23 via an intake valve 22, and to an exhaust passage 25 via an exhaust valve 24. At a central portion of the top wall of combustion chamber 21 is disposed a spark plug 9. From upstream to downstream in intake passage 23 are disposed an air cleaner 26, an air flow meter 3, an electronically controlled throttle valve 27, a throttle position sensor 4, and a fuel injection valve 5. Air flow meter 3 is configured to measure an intake air quantity or an intake air flow of internal combustion engine 20. Throttle valve 27 is configured to open and close intake passage 23. Throttle position sensor 4 is configured to measure a throttle opening of throttle valve 27. Fuel injection valve 5 is configured to inject fuel into an intake port 23A of intake passage 23. Thus, internal combustion engine 20 is of a port injection type, in this embodiment. However, internal combustion engine 20 may be of a direct injection type.

In exhaust passage 25 is disposed a front catalytic converter 13, and a rear catalytic converter 14, in series from upstream to downstream. Front catalytic converter 13 and rear catalytic converter 14 each serve as an exhaust purifier for purifying an exhaust emission. Front catalytic converter 13 is disposed at an upstream portion of exhaust passage 25, that is, disposed at or near an exhaust manifold outlet 25A near combustion chamber 21, where an exhaust gas temperature is relatively high. Rear catalytic converter 14 is disposed at a downstream portion of exhaust passage 25, that is, disposed under a floor panel of a vehicle, where an exhaust gas temperature is relatively low. Thus, in order to efficiently purify the exhaust gas under a wide range of the engine operating condition including cold start, an exhaust purification section (or unit) of internal combustion engine 20 includes a plurality of catalytic converters disposed in series at a plurality of portions of exhaust passage 25 in different thermal conditions. Front catalytic converter 13 is an HC-adsorptive three-way catalytic converter accommodating a three-way catalyst 13A and an HC-adsorptive catalyst 13B. Three-way catalyst 13B serves for reducing exhaust emissions of NOx, HC, and CO to substantially zero when the air fuel ratio is at or near the stoichiometric ratio. HC-adsorptive catalyst 13B serves for temporarily adsorbing HC which passes through three-way catalyst 13A before three-way catalyst 13A is fully activated. Rear catalytic converter 14 accommodates an HC-adsorptive catalyst. Alternatively, however, the exhaust purification section may include one or a combination of the above-mentioned three-way catalyst, the above-mentioned HC-adsorptive catalyst, a NOx trap catalyst, and other exhaust purifiers. The NOx trap catalyst traps NOx in an oxygen-rich atmosphere under lean combustion, and releases NOx under stoichiometric or rich combustion.

An upstream oxygen sensor 11 is disposed at an upstream portion to front catalytic converter 13 in exhaust passage 25. A downstream oxygen sensor 12 is disposed at a downstream portion to front catalytic converter 13 in exhaust passage 25. Oxygen sensors 11, 12 may be each replaced with a wide-range air-fuel ratio sensor capable of measuring a wide range of the air-fuel ratio. A crankshaft position sensor 7 is provided to measure an angular position of the crankshaft of internal combustion engine 20. A camshaft position sensor 8 is provided to measure an angular position or phase of a camshaft of internal combustion engine 20. The engine speed of internal combustion engine 20 is computed based on the sensor signals from crankshaft position sensor 7 and camshaft position sensor 8. In the cylinder block of internal combustion engine 20 are mounted a knock sensor 6 for measuring engine knock, and a coolant temperature sensor 10 for measuring a temperature of the engine coolant.

An engine controller 1, as an electrical control unit, is a digital computer system including a central processing unit (CPU), memories (ROM, RAM), and an input/output interface (I/O). The input/output interface (I/O) of engine controller 1 is configured to receive signals such as a starter signal and an ignition signal through a signal wire 2, and sensor signals from sensors 3, 4, 6-8, and 10-12. Within engine controller 1, the central processing unit (CPU) allows the access by the I/O interface of input data signals from the sensors. The CPU of engine controller 1 is responsible for carrying out a fuel-injection/ignition-timing/throttle control program stored in the memories, and is capable of performing necessary arithmetic and logic operations. Computational results, that is, calculated output signals are relayed through the output interface circuitry of engine controller 1 to output stages through the current control device. Finally, the control signals are output to actuators for regulating engine operating parameters of internal combustion engine 20. Thus, engine controller 1 is configured to control a fuel injection quantity and a fuel injection timing of fuel injection valve 5, and an ignition timing of spark plug 9. In addition, engine controller 1 is configured to control an air-fuel ratio in accordance with the signals from oxygen sensors 11, 12 by feed-back control.

During an engine being in cold conditions in which a catalyst of a catalytic converter is cold and not fully activated, for example, during several tens of seconds after cold start, it is possible that a large proportion of hydrocarbons (HC) pass through the catalytic converter without being purified. In this embodiment, in order to reduce such cold emissions, an exhaust purification section or system of internal combustion engine 20 includes a plurality of HC-adsorptive catalysts, namely an HC-adsorptive catalyst 13b of front catalytic converter 13, and an HC-adsorptive catalyst of rear catalytic converter 14. Front catalytic converter 13 is disposed near exhaust manifold outlet 25A, which is advantageous for promoting thermal activation of front catalytic converter 13, i.e. activation of the catalysts of front catalytic converter 13. In addition, the exhaust purification section includes a purifier activation section configured to perform a purifier activation operation or a catalyst activation operation of controlling the intake air quantity to increase and the ignition timing to retard during the engine being cold, to promote activation of catalytic converters 13, 14.

Figure 2:
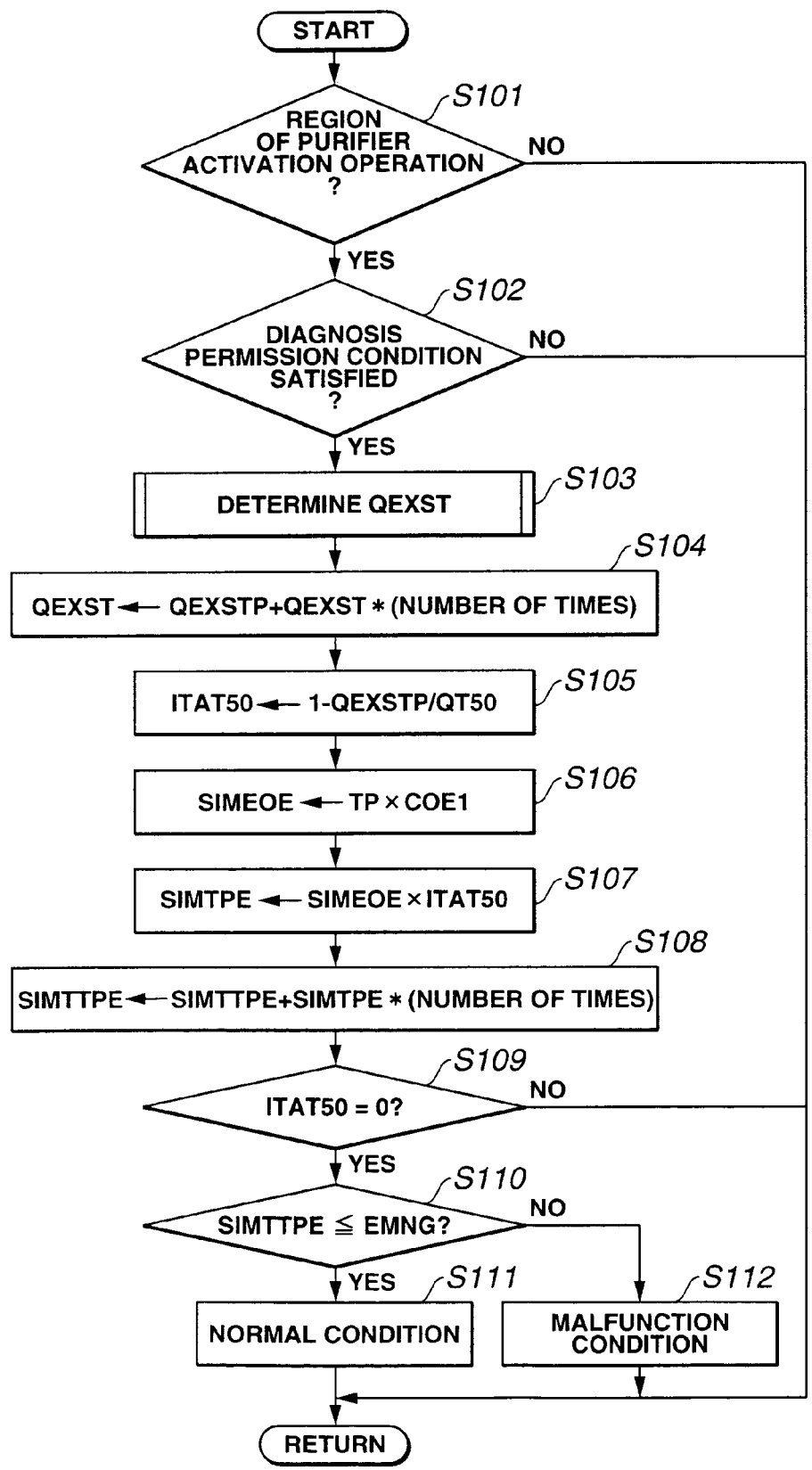
FIG. 2 is a flow chart depicting a diagnostic routine to be executed by a control unit of the diagnostic apparatus in accordance with the embodiment of the present invention.

FIG. 2 is a flow chart depicting a diagnostic routine to be executed by engine controller 1 in accordance with the embodiment of the present invention. The routine of FIG. 2 is repeatedly executed by engine controller 1 at intervals of a predetermined short processing time interval or at intervals of a predetermined number of times of combustion cycles, called by timer interrupt.

First, at step S101, engine controller 1 determines whether or not the engine operating condition is in a region in which the exhaust purification section performs a purifier activation operation of controlling engine operating parameters of internal combustion engine 20 to promote activation of catalytic converters 13, 14. In other words, it is determined whether or not internal combustion engine 20 is in a cold condition in which the catalyst is not fully activated. Specifically, the determination is performed in accordance with criteria including a criterion that the coolant temperature is lower than or equal to a predetermined threshold value about 25 to 30° C. When the answer to step S101 is affirmative (YES), the routine proceeds to step S102. On the other hand, when the answer to step S101 is negative (NO), the routine returns.

At step S102, engine controller 1 determines whether or not a predetermined diagnosis permission condition is satisfied. The diagnosis permission condition includes a condition that sensors used in the purifier activation operation, namely air flow meter 3, crankshaft position sensor 7, camshaft position sensor 8, oxygen sensors 11, 12 are normal. As mentioned below, in order to perform diagnostic operation under a wide range of the engine operating condition, the diagnosis permission condition does not include a condition concerning the state of the operating mode such as an idle mode, a condition concerning the engine load, and a condition concerning the engine speed. When the answer to step S102 is YES, the routine proceeds to step S103. On the other hand, when the answer to step S102 is NO, the routine returns.

Figure 3:
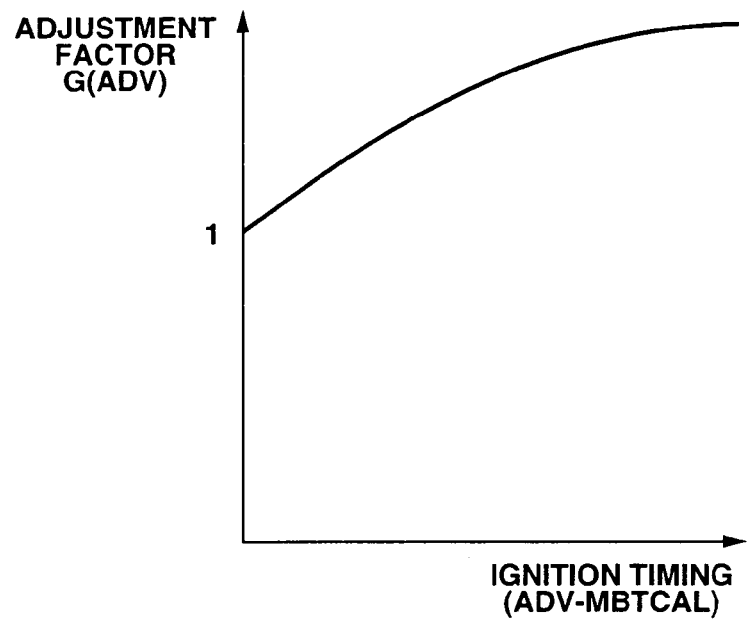
FIG. 3 illustrates a characteristic map for determining an ignition-timing-based adjustment factor G(ADV) at step S103 in the flow chart of FIG. 2.
Figure 4:
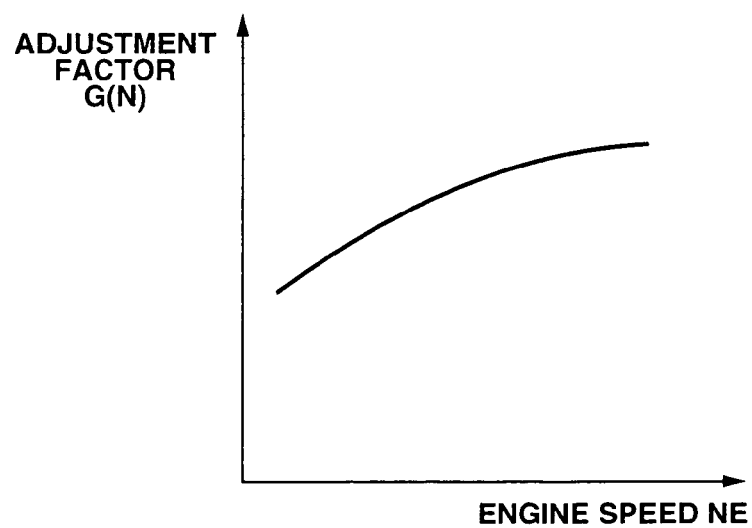
FIG. 4 illustrates a characteristic map for determining an engine-speed-based adjustment factor G(N) at step S103 in the flow chart of FIG. 2.

At step S103, engine controller 1 determines an exhaust heat rate QEXST as a quantity of heat exiting combustion chamber 21 over a unit period of combustion or as a quantity of heat entering catalytic converters 13, 14 over a unit period of combustion, in accordance with a fuel injection quantity TP as a quantity of fuel injected into combustion chamber 21 over a unit period of combustion, using the following equation (1). The unit period of combustion is a duration of a predetermined number of combustion cycles.

$$QEXST = TP \cdot G(ADV) \cdot G(N) \qquad (1)$$

where TP is a fuel injection quantity, G(ADV) is an ignition-timing-based adjustment factor, and G(N) is an engine-speed-based adjustment factor. Ignition-timing-based adjustment factor G(ADV) is determined using a characteristic map as shown in FIG. 3 in accordance with a delay (ADV-MBTCAL) of ignition timing ADV with respect to a normally optimal ignition timing such as minimum advance for best torque (MBT). As shown in FIG. 3, ignition-timing-based adjustment factor G(ADV) is set to increase with an increase in delay (ADV-MBTCAL) so that exhaust heat rate QEXST increases with an increase in delay (ADV-MBTCAL), which is consistent with a phenomenon that fuel economy decreases with an increase in delay (ADV-MBTCAL) to increase the exhaust gas temperature. Engine-speed-based adjustment factor G(N) is determined using a characteristic map as shown in FIG. 4 in accordance with an engine speed NE. As shown in FIG. 4, engine-speed-based adjustment factor G(N) is set to increase with an increase in engine speed NE so that exhaust heat rate QEXST increases with an increase in engine speed NE, which is consistent with a phenomenon that an interval between combustion cycles decreases with an increase in engine speed NE to reduce heat release. Thus, exhaust heat rate QEXST is determined canceling the effects of engine speed NE and ignition timing ADV.

Subsequent to step S103, at step S104, engine controller 1 determines a total exhaust heat quantity QEXSTP as a quantity of heat exiting combustion chamber 21 during internal combustion engine 20 being cold or as a quantity of heat entering catalytic converters 13, 14 during internal combustion engine 20 being cold, by integrating exhaust heat rate QEXST. Specifically, total exhaust heat quantity QEXSTP is updated by summing the immediately preceding value of total exhaust heat quantity QEXSTP and the product of exhaust heat rate QEXST and the number of unit periods of combustion after the immediately preceding execution.

Subsequent to step S104, at step S105, engine controller 1 determines a purifier residual emission ratio ITAT50 as a ratio or a proportion of a quantity of HC which passes through catalytic converters 13, 14 without being purified. Specifically, purifier residual emission ratio ITAT50 is calculated in accordance with total exhaust heat quantity QEXSTP, using the following equation (2):

$$ITAT50 = 1 - QEXSTP/QT50 \qquad (2)$$

where QT50 is a quantity of heat required for full activation of catalytic converters 13, 14.

Figure 5:
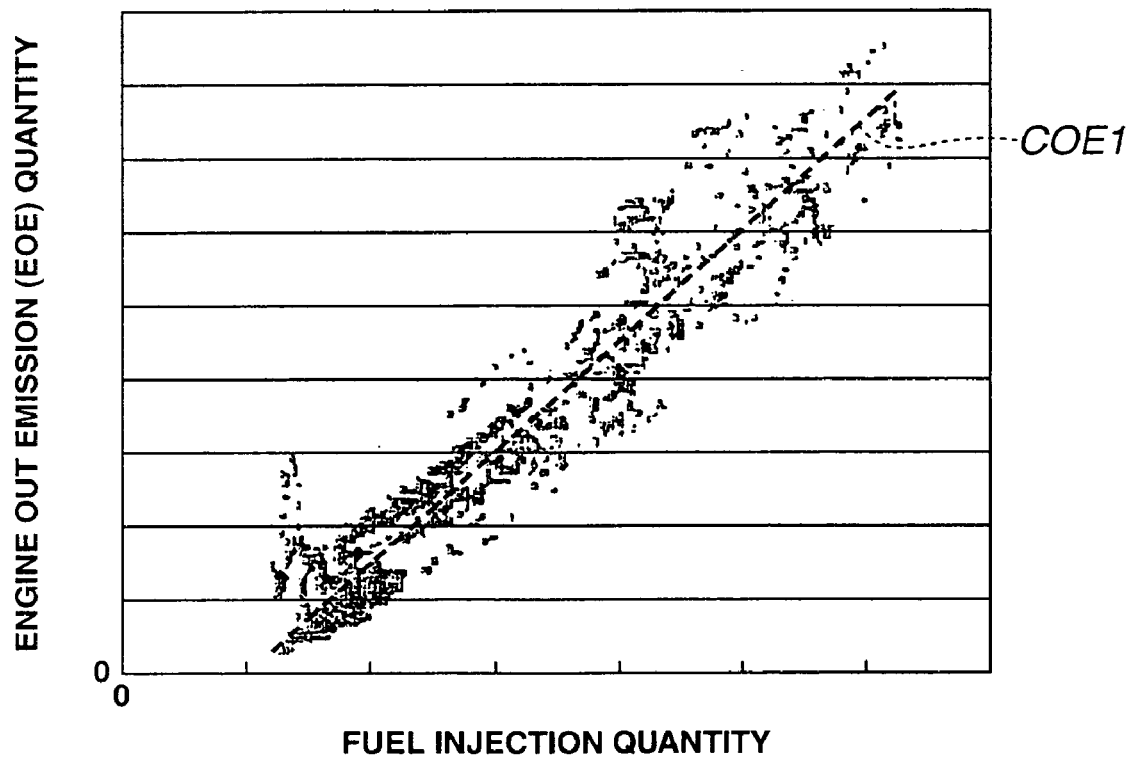
FIG. 5 illustrates a relationship between a fuel injection quantity and an engine out emission quantity.

Subsequent to step S105, at step S106, engine controller 1 determines an engine out emission rate SIMEOE as a quantity (EOE) of HC exiting combustion chamber 21 over a unit combustion period or as a quantity (EOE) of HC entering catalytic converters 13, 14 over a unit combustion period, in accordance with fuel injection quantity TP. FIG. 5 illustrates a relationship between a fuel injection quantity and an engine out emission quantity (EOE). As shown in FIG. 5, engine out emission quantity (EOE) varies linearly with fuel injection quantity TP along its regression coefficient COE1. Accordingly, engine out emission rate SIMEOE is simply calculated by multiplying fuel injection quantity TP and regression coefficient COE1.

Subsequent to step S106, at step S107, engine controller 1 determines a purifier out emission rate SIMTPE as a quantity of HC exiting catalytic converters 13, 14 over a unit combustion period in accordance with purifier residual emission ratio ITAT50 and engine out emission rate SIMEOE. Specifically, purifier out emission rate SIMTPE is calculated by multiplying purifier residual emission ratio ITAT50 and engine out emission rate SIMEOE. Subsequent to step S107, at step S108, engine controller 1 determines a total purifier out emission quantity SIMTTPE as a quantity of HC exiting catalytic converters 13, 14 during internal combustion engine 20 being cold, by integrating purifier out emission rate SIMTPE. Specifically, total purifier out emission quantity SIMTTPE is updated by summing the immediately preceding value of total purifier out emission quantity SIMTTPE and the product of purifier out emission rate SIMTPE and the number of unit periods of combustion after the immediately preceding execution.

Subsequent to step S108, at step S109, engine controller 1 determines whether or not purifier residual emission ratio ITAT50 is equal to a predetermined reference value such as zero. The reference value is not limited to zero. Alternatively, the reference value may be a large positive value in order to reduce the period of the diagnostic operation, or may be a small positive value in order to ensure the accuracy of diagnosis. When the answer to step S109 is YES, the routine proceeds to step S110. On the other hand, when the answer to step S109 is NO, the routine returns.

At step S110, engine controller 1 determines normality of the purifier activation operation, that is, normality of the exhaust purification section. Specifically, engine controller 1 determines whether or not total purifier out emission quantity SIMTTPE is smaller than or equal to a predetermined threshold value EMNG. Threshold value EMNG is set to about one and a half times as large as total purifier out emission quantity SIMTTPE in normal conditions. When the answer to step S110 is YES, the routine proceeds to step S111. At step S111, engine controller 1 determines that the purifier activation operation is normal. Subsequent to step S111, the routine returns. On the other hand, when the answer to step S110 is NO, the routine proceeds to step S112. At step S112, engine controller 1 determines that the purifier activation operation is abnormal. Subsequent to step S112, the routine returns. Thus, it is determined that the purifier activation operation is normal, when total purifier out emission quantity SIMTTPE is smaller than or equal to a predetermined threshold value EMNG. When it is determined that the purifier activation operation is abnormal, engine controller 1 informs a driver of malfunction of the purifier activation operation or the exhaust purification section by means of a warning ramp or a warning sound.

Figure 6A:
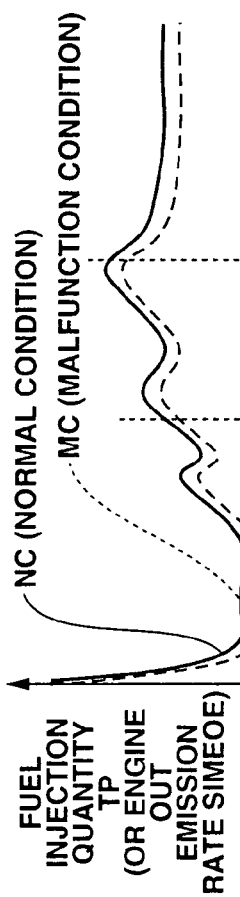
FIGS. 6A through 6D illustrate how computational variables vary with time in cold start under a normal condition and under a malfunction condition.
Figure 6B:
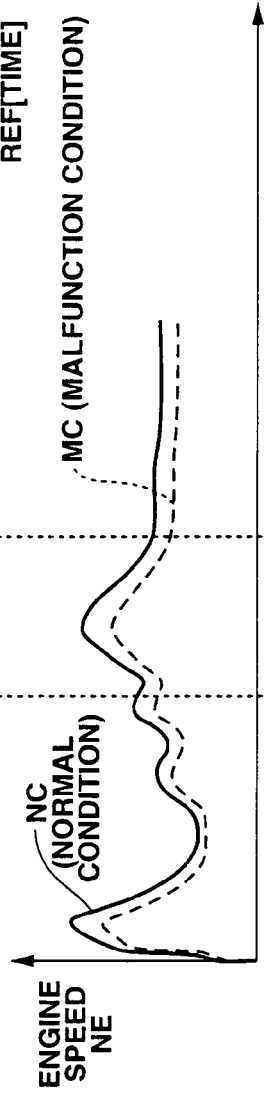
Figure 6C:
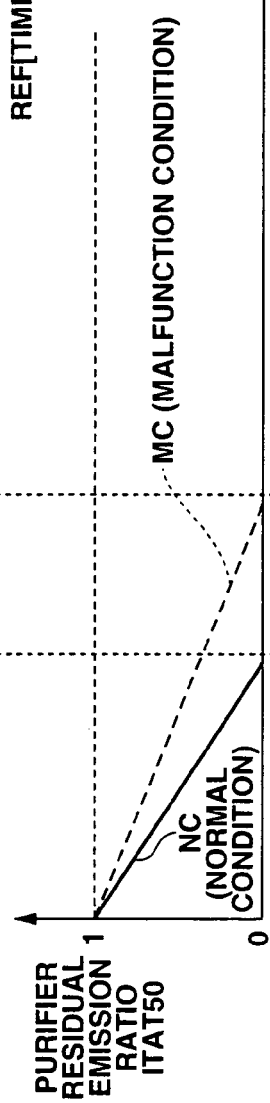
Figure 6D:
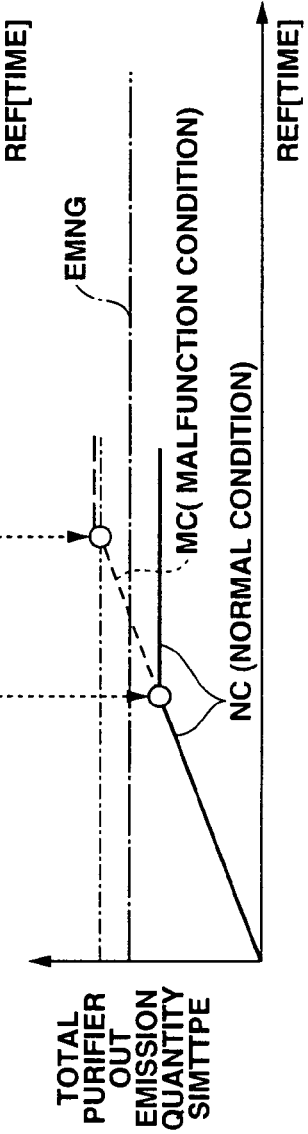

FIGS. 6A through 6D illustrate how computational variables vary with time in cold start under a normal condition and under a malfunction condition. In FIGS. 6A through 6D, the normal condition is indicated by solid lines, and the abnormal condition or malfunction condition is indicated by broken lines. The vertical axes each indicate time or the crank angle of reference point REF. As shown in FIG. 6D, total purifier out emission quantity SIMTTPE increases linearly with the crank angle, independently of engine speed NE, because total purifier out emission quantity SIMTTPE is calculated in consideration of engine speed NE and ignition timing ADV. Total purifier out emission quantity SIMTTPE reaches its maximum value when purifier residual emission ratio ITAT50 reaches zero. At the point, total purifier out emission quantity SIMTTPE is compared with threshold value EMNG to diagnose the purifier activation operation. Thus, the diagnostic apparatus performs an accurate diagnosis in a short period of time.

The following describes effects or advantages produced by the diagnostic apparatus in accordance with the embodiment of the present invention, and describes modifications of the embodiment.

In this embodiment is shown a diagnostic apparatus for an internal combustion engine (20), including an exhaust purification section including: an exhaust purifier (13, 14) disposed in an exhaust passage (25) of the internal combustion engine (20), for purifying an exhaust emission (HC); and a purifier activation section configured to control engine operating parameters of the internal combustion engine (20) to promote activation of the exhaust purifier (13, 14) during the internal combustion engine (20) being cold; and a control unit (1) configured to perform the following: determining a state (ITAT50) of the exhaust purifier (13, 14); determining a total purifier out emission quantity (SIMTTPE) as a quantity of the exhaust emission (HC) exiting the exhaust purifier (13, 14) during the internal combustion engine (20) being cold, in accordance with the state (ITAT50) of the exhaust purifier (13, 14); and determining normality of the exhaust purification section in accordance with the total purifier out emission quantity (SIMTTPE).

In other words, there is shown a method of diagnosing an internal combustion engine (20) including an exhaust purification section, the exhaust purification section including an exhaust purifier (13, 14) disposed in an exhaust passage (25) of the internal combustion engine (20), for purifying an exhaust emission (HC), and a purifier activation section configured to control engine operating parameters of the internal combustion engine (20) to promote activation of the exhaust purifier (13, 14) during the internal combustion engine (20) being cold, the method including: determining a state (ITAT50) of the exhaust purifier (13, 14); determining a total purifier out emission quantity (SIMTTPE) as a quantity of the exhaust emission (HC) exiting the exhaust purifier (13, 14) during the internal combustion engine (20) being cold, in accordance with the state (ITAT50) of the exhaust purifier (13, 14); and determining normality of the exhaust purification section in accordance with the total purifier out emission quantity (SIMTTPE).

In case there is a malfunction in the purifier activation operation such as in the operation of increasing the intake air quantity and in the operation of retarding the ignition timing, total purifier out emission quantity SIMTTPE ultimately increases. Total purifier out emission quantity SIMTTPE varies not only in accordance with purifier out emission rate SIMTPE, but also in accordance with the state of the catalytic converter such as purifier residual emission ratio ITAT50. In this embodiment, however, the diagnostic apparatus configured to determine total purifier out emission quantity SIMTTPE in accordance with the state of the exhaust purifier, and to determine normality of the exhaust purification section in accordance with total purifier out emission quantity SIMTTPE, is effective for performing an accurate diagnostic operation with a simple structure which does not necessarily require a catalyst temperature sensor.

As mentioned above, the system of JP2001-132526, which performs diagnosis mainly in accordance with the engine speed and the ignition timing, is substantially limited to a specific region of the engine operating condition such as idle conditions. In contrast, the diagnostic apparatus in accordance with the embodiment is configured to determine purifier residual emission ratio ITAT50 and total purifier out emission quantity SIMTTPE in consideration of the ignition timing and the engine speed, namely, canceling effects by changes of the ignition timing and the engine speed. The normality diagnosis is finally performed based on total purifier out emission quantity SIMTTPE. Thus, the diagnostic operation is applicable to many driving patterns in actual usages, namely to a wide range of the engine operating condition which includes idle conditions and driving conditions in which the vehicle is traveling, with its high accuracy held.

The diagnostic apparatus wherein the control unit (1) is configured to perform the following: determining a purifier out emission rate (SIMTPE) as a quantity of the exhaust emission (HC) exiting the exhaust purifier (13, 14) over a unit period of combustion of the internal combustion engine (20); and determining the total purifier out emission quantity (SIMTTPE) by integrating the purifier out emission rate (SIMTPE), is effective for accurately estimating the quantity of the exhaust emission exiting the catalytic converter, by following changes in the quantity of the exhaust emission exiting the catalytic converter during transient phases of the engine operating condition such as acceleration from idle. A unit combustion period may include a plurality of combustion cycles over the computational interval or preferably include only one combustion cycle.

In this embodiment, the state of the catalytic converter is an activity state of the catalytic converter, specifically a purifier residual emission ratio ITAT50 as a proportion of a quantity of the exhaust emission which passes through the catalytic converter without being purified. However, the state of the catalytic converter may be another parameter indicative of the activity state of the catalytic converter, such as a catalyst temperature which is estimated or detected by a catalyst temperature sensor.

The diagnostic apparatus wherein the control unit (1) is configured to perform the following: determining an engine out emission rate (SIMEOE) as a quantity of the exhaust emission (HC) entering the exhaust purifier (13, 14) over the unit period of combustion, in accordance with a fuel injection quantity (TP) as a quantity of fuel injected in the internal combustion engine (20) over the unit period of combustion; and determining the purifier out emission rate (SIMTPE) in accordance with the purifier residual emission ratio (ITAT50) and the engine out emission rate (SIMEOE), is effective for accurately estimating purifier out emission rate SIMTPE in accordance with engine out emission rate SIMEOE, in consideration of the activity state of the catalytic converter.

The diagnostic apparatus wherein the control unit (1) is configured to perform the following: determining an exhaust heat rate (QEXST) as a quantity of heat entering the exhaust purifier (13, 14) over the unit period of combustion, in accordance with a fuel injection quantity (TP) as a quantity of fuel injected in the internal combustion engine (20) over the unit period of combustion; determining a total exhaust heat quantity (QEXSTP) as a quantity of heat entering the exhaust purifier (13, 14) during the internal combustion engine (20) being cold, by integrating the exhaust heat rate (QEXST); and determining the purifier residual emission ratio (ITAT50) in accordance with the total exhaust heat quantity (QEXSTP), is effective for accurately estimating purifier residual emission ratio ITAT50 without a device for directly sensing the catalyst temperature, such as a catalyst temperature sensor. In addition, calculating total exhaust heat quantity QEXSTP by integrating exhaust heat rate QEXST is effective for accurate estimation in consideration of transient phases in which the engine operating condition varies.

The diagnostic apparatus wherein the control unit (1) is configured to calculate the purifier residual emission ratio (ITAT50) using the following equation: ITAT50=1−QEXSTP/QT50 where: ITAT50 is the purifier residual emission ratio, QEXSTP is the total exhaust heat quantity, and QT50 is a quantity of heat required for full activation of the exhaust purifier (13, 14), is effective for simply and accurately estimating purifier residual emission ratio ITAT50, and thereby for reducing computational load and allocated memory size in the diagnostic operation.

The diagnostic apparatus wherein the control unit (1) is configured to adjust the exhaust heat rate (QEXST) to increase with an increase in a delay of an ignition timing of the internal combustion engine (20) with respect to a normally optimal ignition timing (MBT), is effective for accurately canceling effects from the change of the ignition timing to total exhaust heat quantity QEXSTP in each unit combustion period.

The diagnostic apparatus wherein the control unit (1) is configured to adjust the exhaust heat rate (QEXST) to increase with an increase in an engine speed of the internal combustion engine (20), is effective for accurately canceling effects from the change of the engine speed to total exhaust heat quantity QEXSTP in each unit combustion period.

The diagnostic apparatus wherein the control unit (1) is configured to perform the following: determining whether or not the purifier residual emission ratio (ITAT50) is lower than or equal to a predetermined reference value; and determining normality of the exhaust purification section in accordance with the total purifier out emission quantity (SIMTTPE), when it is determined that the purifier residual emission ratio (ITAT50) is lower than or equal to the reference value, is effective for determining the moment of the normality determination without using an additional parameter for determining the moment of the normality determination.

In this embodiment, the target exhaust emission includes hydrocarbons (HC). The target exhaust emission may be particulate molecules (PM), nitrogen oxides (NOx), or carbon monoxide (CO).

This application is based on a prior Japanese Patent Application No. 2004-276634 filed on Sep. 24, 2004. The entire contents of this Japanese Patent Application No. 2004-276634 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A diagnostic apparatus for an internal combustion engine, comprising:
an exhaust purification section comprising:
an exhaust purifier disposed in an exhaust passage of the internal combustion engine, for purifying an exhaust emission; and
a purifier activation section configured to control engine operating parameters of the internal combustion engine to promote activation of the exhaust purifier during the internal combustion engine being cold; and
a control unit configured to perform the following:
determining a total exhaust heat quantity as a quantity of heat entering the exhaust purifier during the internal combustion engine being cold;
determining a state of the exhaust purifier in accordance with the total exhaust heat quantity, wherein the state of the exhaust purifier includes a purifier residual emission ratio as a proportion of a quantity of the exhaust emission which passes through the exhaust purifier without being purified;
determining a total purifier out emission quantity as a quantity of the exhaust emission exiting the exhaust purifier during the internal combustion engine being cold, in accordance with the state of the exhaust purifier; and
determining normality of the exhaust purification section in accordance with the total purifier out emission quantity.

2. The diagnostic apparatus as claimed in claim 1, wherein the control unit is configured to calculate the purifier residual emission ratio using the following equation:

$$ITAT50 = 1 - QEXSTP/QT50$$

where:
ITAT50 is the purifier residual emission ratio,
QEXSTP is the total exhaust heat quantity, and
QT50 is a quantity of heat required for full activation of the exhaust purifier.

3. The diagnostic apparatus as claimed in claim 1, wherein the exhaust emission includes hydrocarbons.

4. The diagnostic apparatus as claimed in claim 1, wherein the control unit is configured to determine the purifier residual emission ratio by comparison between the total exhaust heat quantity and a quantity of heat required for full activation of the exhaust purifier.

5. The diagnostic apparatus as claimed in claim 1, wherein the control unit is configured to perform the following:
determining a purifier out emission rate as a quantity of the exhaust emission exiting the exhaust purifier over a unit period of combustion of the internal combustion engine; and
determining the total purifier out emission quantity by integrating the purifier out emission rate.

6. The diagnostic apparatus as claimed in claim 5, wherein the control unit is configured to perform the following:
determining an engine out emission rate as a quantity of the exhaust emission entering the exhaust purifier over the unit period of combustion, in accordance with a fuel injection quantity as a quantity of fuel injected in the internal combustion engine over the unit period of combustion; and
determining the purifier out emission rate in accordance with the purifier residual emission ratio and the engine out emission rate.

7. The diagnostic apparatus as claimed in claim 6, wherein the engine out emission rate is proportional to the fuel injection quantity.

8. The diagnostic apparatus as claimed in claim 6, wherein the purifier out emission rate is a product of the purifier residual emission ratio and the engine out emission rate.

9. The diagnostic apparatus as claimed in claim 5, wherein the control unit is configured to perform the following:
   determining whether or not the purifier residual emission ratio is lower than or equal to a predetermined reference value; and
   determining normality of the exhaust purification section in accordance with the total purifier out emission quantity, when it is determined that the purifier residual emission ratio is lower than or equal to the reference value.

10. The diagnostic apparatus as claimed in claim 9, wherein the control unit is configured to determine that the exhaust purification section is abnormal, if the total purifier out emission quantity is larger than a predetermined threshold value when it is determined that the purifier residual emission ratio is lower than or equal to the reference value.

11. The diagnostic apparatus as claimed in claim 5, wherein the unit period of combustion consists of one combustion cycle of the internal combustion engine.

12. The diagnostic apparatus as claimed in claim 1, wherein the control unit is configured to perform the following:
   determining an exhaust heat rate as a quantity of heat entering the exhaust purifier over a unit period of combustion, in accordance with a fuel injection quantity as a quantity of fuel injected in the internal combustion engine over the unit period of combustion; and
   determining the total exhaust heat quantity by integrating the exhaust heat rate.

13. The diagnostic apparatus as claimed in claim 12, wherein the control unit is configured to adjust the exhaust heat rate to increase with an increase in a delay of an ignition timing of the internal combustion engine with respect to a normally optimal ignition timing.

14. The diagnostic apparatus as claimed in claim 12, wherein the control unit is configured to adjust the exhaust heat rate to increase with an increase in an engine speed of the internal combustion engine.

15. A diagnostic apparatus for an internal combustion engine, comprising:
   an exhaust purification section comprising:
      an exhaust purifier disposed in an exhaust passage of the internal combustion engine, for purifying an exhaust emission; and
      means for promoting activation of the exhaust purifier during the internal combustion engine being cold;
   means for determining a total exhaust heat quantity as a quantity of heat entering the exhaust purifier during the internal combustion engine being cold;
   means for determining a state of the exhaust purifier in accordance with the total exhaust heat quantity, wherein the state of the exhaust purifier includes a purifier residual emission ratio as a proportion of a quantity of the exhaust emission which passes through the exhaust purifier without being purified;
   means for determining a total purifier out emission quantity as a quantity of the exhaust emission exiting the exhaust purifier during the internal combustion engine being cold, in accordance with the state of the exhaust purifier; and
   means for determining normality of the exhaust purification section in accordance with the total purifier out emission quantity.

16. A method of diagnosing an internal combustion engine including an exhaust purification section, the exhaust purification section including an exhaust purifier disposed in an exhaust passage of the internal combustion engine, for purifying an exhaust emission, and a purifier activation section configured to control engine operating parameters of the internal combustion engine to promote activation of the exhaust purifier during the internal combustion engine being cold, the method comprising:
   determining a total exhaust heat quantity as a quantity of heat entering the exhaust purifier during the internal combustion engine being cold;
   determining a state of the exhaust purifier in accordance with the total exhaust heat quantity, wherein the state of the exhaust purifier includes a purifier residual emission ratio as a proportion of a quantity of the exhaust emission which passes through the exhaust purifier without being purified;
   determining a total purifier out emission quantity as a quantity of the exhaust emission exiting the exhaust purifier during the internal combustion engine being cold, in accordance with the state of the exhaust purifier; and
   determining normality of the exhaust purification section in accordance with the total purifier out emission quantity.

* * * * *